July 1, 1924.

W. R. LEAS

MATCH BOX HOLDER

Filed Nov. 12, 1923

Warren R. Leas
INVENTOR

BY Victor J. Evans
ATTORNEY

WITNESS: R. E. Wise.
P. C. Gannon

July 1, 1924.
W. R. LEAS
MATCH BOX HOLDER
Filed Nov. 12, 1923    2 Sheets-Sheet 2
1,500,084
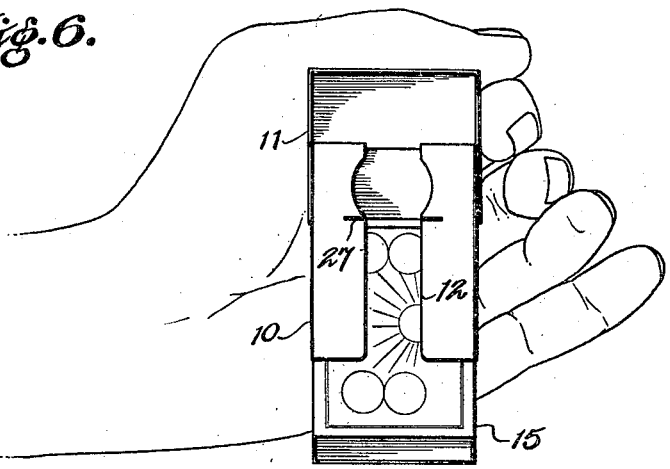
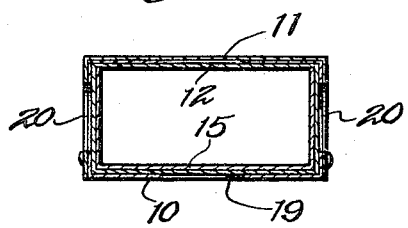
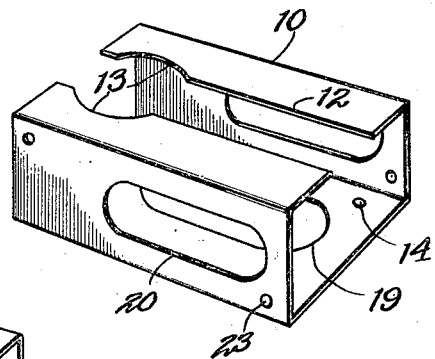
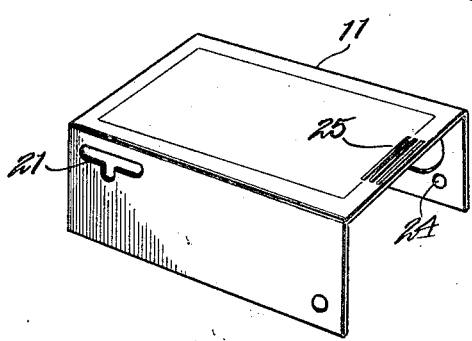
Warren R. Leas
INVENTOR
BY *Victor J. Evans*
ATTORNEY
WITNESS:

Patented July 1, 1924.

1,500,084

UNITED STATES PATENT OFFICE.

WARREN R. LEAS, OF WYOMING, PENNSYLVANIA.

MATCH-BOX HOLDER.

Application filed November 12, 1923. Serial No. 674,291.

*To all whom it may concern:*

Be it known that I, WARREN R. LEAS, a citizen of the United States, residing at Wyoming, in the county of Luzerne and State of Pennsylvania, have invented new and useful Improvements in Match-Box Holders, of which the following is a specification.

This invention relates to holders for match boxes, an object being to provide a holder which will protect the box from becoming crushed and from which the matches may be conveniently extracted.

Another object of the invention is the provision of a match box holder which may be arranged to provide a wind shield for the protection of the match flame, so that a match may be kept lighted for a relatively long period even in windy weather.

Another object of the invention is the provision of a match box holder embodying the above and other advantages, which is simple in construction, may be easily manipulated and which will present an attractive appearance.

With the above and other objects in view, the invention further includes the following novel features and details of construction, to be hereinafter more fully described, illustrated in the accompanying drawings and pointed out in the appended claim.

In the drawings:—

Figure 4 is a transverse section.

Figure 6 is a view illustrating the use of the invention as a wind shield.

Figure 7 is a detail perspective view of the inner section.

Figure 8 is a similar view of the outer section.

Figure 1:
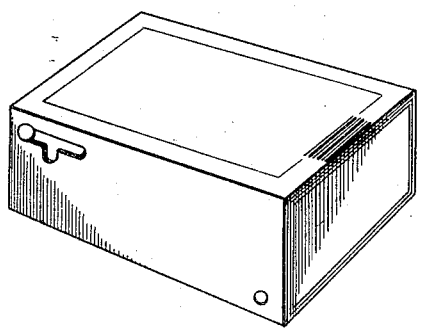
Figure 1 is a perspective view of a match box holder constructed in accordance with the invention with the holder in closed position.

Referring to the drawings in detail wherein like characters of reference denote corresponding parts, the holder as shown comprises an inner section 10 and an outer section 11. These sections may be made of any suitable material, the inner section being cross sectionally rectangular and split longitudinally as shown at 12 with the opposed edges provided with semi-circular recesses 13 near one end thereof. The inner section which forms the back of the holder is provided with indentations forming projections 14 which extend inwardly for frictional engagement with a box 15. The inner section or back is further provided with a finger opening 19 while the opposite side edges of the said section are provided with openings 20, the latter providing access to the sides of the box 15 for striking matches.

The outer section 11 is substantially U-shaped in cross section and is provided with substantially T-shaped slots 21 in its opposite sides. These slots receive headed pins 22 and provide a sliding and pivotal connection between the holder sections. The sections are held against accidental relative movement by means of projections 23 which extend from the sides of the section 10 and which enter sockets 24 in the sides of the sections 11.

Figure 2:
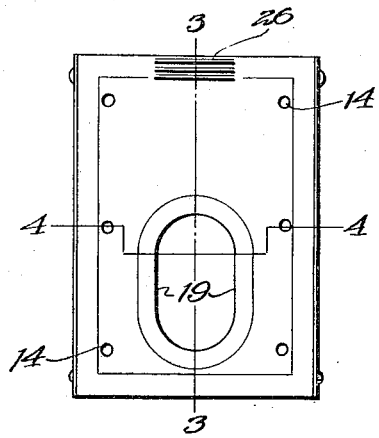
Figure 2 is a rear elevation of the same.
Figure 5:
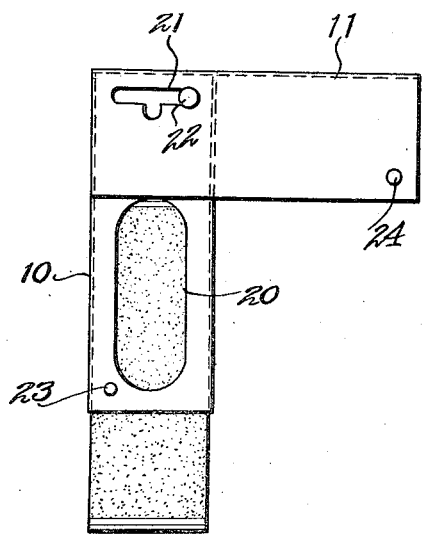
Figure 5 is a side view showing the holder open.
Figure 3:
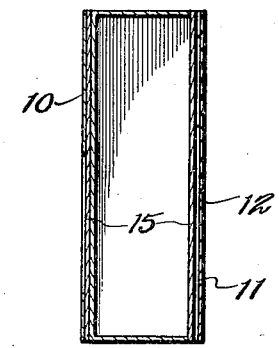
Figure 3 is a longitudinal sectional view.

When the sections are closed as shown in Figures 1 to 4 of the drawings, relative pivotal movement will be prevented due to the edge of the section 11 engaging the adjacent face of the section 10 near the edge thereof. It is therefore necessary to move the sections longitudinally with respect to one another and to facilitate this the outer section 11 or what might be termed the top of the said section is provided with serrations 25, while the back of the other section is provided with serrations 26 so as to provide frictional gripping means to disengage the projections 23 from the sockets 24. After the sections have been moved longitudinally, the headed pins are positioned within the offset portions of the T-slots 21 whereupon the sections may be moved pivotally and arranged substantially at right angles so that the projecting portion of the outer section 11 forms an effective wind shield. It is preferred to place the box 15 in the position shown in Figure 6, that is, with one edge of the box registering with transverse marks 27. When used as a wind shield, the flame will be effectually protected, such wind as passes through the opening provided between the adjacent edges of the sections merely acting to force the flame toward the person using the holder and acts to facilitate the lighting of a cigarette or cigar. The opposite corners of the opposed edges of the inner section 10 are preferably rounded as shown so as to protect the fingers of the user from injury due to contact with sharp corners. By arranging the box 15 in the position shown in Figure 6 of the drawings air will be prevented from coming in through the slot in the back or through the sides.

The holder may be suitably ornamented if desired so as to provide an attractive as well as a convenient article.

The invention is susceptible of various changes in its form, proportions and minor details of construction and the right is herein reserved to make such changes as properly fall within the scope of the appended claim.

Having described the invention what is claimed is:—

A match box holder comprising an inner box receiving section, an outer section subsantially U-shaped in cross section and provided in its opposite sides with substantially T-shaped slots and headed pins extending from the sides of the inner section through said slots to provide a sliding pivotal connection between the sections.

In testimony whereof I affix my signature.

WARREN R. LEAS.